July 2, 1968     A. O. LUNING ET AL     3,390,931

TELESCOPIC EYEPIECE ASSEMBLY WITH SHUTTER MEANS

Filed July 22, 1965

INVENTORS,
ALFRED O. LUNING
TOM E. MOORE
CARLYLE D. CHARLTON

BY Harry M. Saragovitz
Edward J. Kelly
Herbert Berl
John W. Poteet, Jr.
ATTORNEYS

United States Patent Office 3,390,931
Patented July 2, 1968

3,390,931
TELESCOPIC EYEPIECE ASSEMBLY WITH SHUTTER MEANS
Alfred O. Luning, Oxon Hill, Md., and Tom E. Moore, Springfield, and Carlyle D. Charlton, Alexandria, Va., assignors to the United States of America as represented by the Secretary of the Army
Filed July 22, 1965, Ser. No. 474,192
6 Claims. (Cl. 350—57)

ABSTRACT OF THE DISCLOSURE

A light shielding means for an optical telescope assembly which is adapted for covering of the eyepiece end thereof when the assembly is not in use. The light shielding means is adapted to automatically cover the eyepiece lens upon removal of the assembly from the viewer's eye.

---

The invention described herein may be manufactured and used by or for the Government of the United States of America for governmental purposes without the payment to us of any royalties thereon.

Great strides have been made in the field of night vision in recent years, and it is now possible to effectively "see in the dark" utilizing modern illumination and/or light processing techniques. Such techniques usually involve an image intensifier means which serves to amplify the visual image input to a useful magnitude. This amplified image is then displayed on a phosphor screen within the housing of the image intensifier means.

While such devices generally perform satisfactorily, it has been found that lens condensation frequently presents a problem and that a light glow from the phosphor screen may be readily detected under certain circumstances.

It will be appreciated that it is essential in most military night vision applications that the observer be concealed and that any significant amount of light emanating from the sighting device defeats this requirement. In particular, it has been found that light glow from the phosphor screen is difficult to shield under some circumstances; for example, this glow may illuminate the face of the observer as his eye is removed from the eyepiece or it may otherwise reveal the presence of personnel if inadvertently dropped with the image intensifier in operation. Various electrical disconnect and/or mechanical closure devices have been devised which alleviate the illumination problem by shutting off the image intensifier means or interrupting the output light path therefrom. These devices have effectively alleviated the illumination problem to some extent, but in each instance, one or more problems have developed which preclude the use of such devices in military combat applications. For example, proposed electrical devices incorporating signaling and/or switching means have been found susceptible to detection by electrical signal responsive devices. Likewise, proposed mechanical shutter mechanisms actuated by pushrod action, either by hand control or by forehead contact, have presented moisture and dust proofing problems.

It is recognized that a relatively safe, positive action means which avoids extraneous lighting in night viewing devices is needed and would be welcomed as a substantial advancement of the art.

Accordingly, it is an object of this invention to provide a positive action means for minimizing face illumination by phosphor screen glow in night vision sighting devices.

It is also an object of this invention to provide a self-closing means for minimizing face illumination by phosphor screen glow in night vision sighting devices.

It is another object of this invention to provide a self-closing means of the variety indicated above which would preclude eye or head injury from gun recoil or other forces bringing together the telescope and the user's eye and head.

It is still another object of this invention to provide a self-closing means of the variety indicated above which would preclude the formation of condensation on the eyepiece lens.

It is an additional object of this invention to provide a relatively simple self-closing means of the variety indicated above having a minimum number of cooperating parts.

It is a further object of this invention to provide a self-closing means of the variety indicated above which is relatively inexpensive to fabricate, replace in entirety, or remove in part.

It is also an object of this invention to provide a self-closing means of the variety indicated above which serves to protect the eyepiece lens.

It is another object of this invention to provide a self-closing means of the variety indicated above which does not require use of the hands to operate.

It is still another object of this invention to provide a self-closing means of the variety indicated above which may be disposed in close proximity to the eyepiece lens to minimize the size of the air cavity in the immediate vicinity of the lens.

Other objects of the invention will become apparent upon a more comprehensive understanding of the invention for which reference is had to the following specification and drawings wherein.

Figure 1:
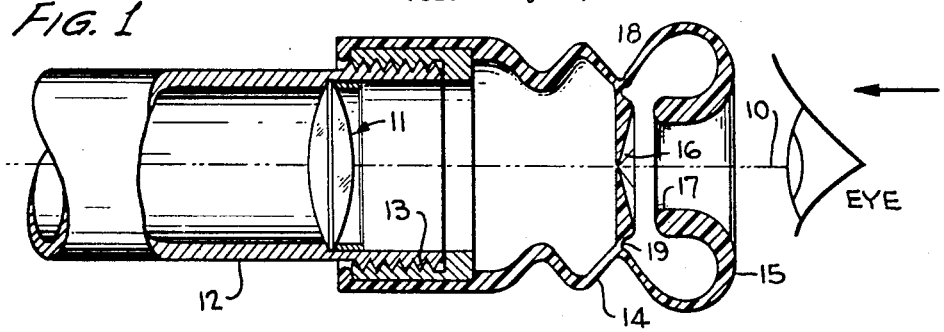
FIGURE 1 is a cross-sectional showing of one embodiment of the device of this invention.

Briefly, the self-closing eyepiece assembly of this invention incorporates an accordion fold tubular member which is adapted to act upon a segmented shutter which serves as an aperture cover such that, in a preferred embodiment, compression of the accordion fold member opens the aperture and removal of the compression force closes the aperture.

Referring now to the drawings in more detail:

The eyepiece portion of a typical night vision sighting means is shown in FIGURE 1. This eyepiece assembly which is adapted in accordance with a first embodiment of the device of this invention comprises a lens 11 axially disposed within a visual display telescopic body, indicated at 12, having a threaded end, indicated at 13, for attachment of the eyeshield, indicated at 14, in geometric alignment with the line of sight of the telescopic device, indicated at 10.

In the embodiment of FIGURE 1 the eyeshield 14 has an accordion fold tubular configuration with a flexible, rolled over eyerest, indicated at 15, which is adapted to act upon a deformable segmented shutter 16 when a compression force is applied (in the direction of the arrow) such that the free end of the rolled eyerest, indicated at 17, contacts the several segments of the shutter 16 to facilitate a bending of the segments into axial alignment and an aperture is thus obtained.

In accordance with the invention the eyeshield 14 and the segmented shutter 16 are of an opaque resilient material such as natural rubber or neoprene. It is desirable, of course, that the cooperating elements 15 and 16 in FIGURE 1 have maximum flexibility at selected points, and, in the depicted embodiment, it has been found that the region of the eyerest 15, indicated at 18, should be most flexible and that the iris segments be most flexible in the hinge areas indicated at 19.

Figure 2:
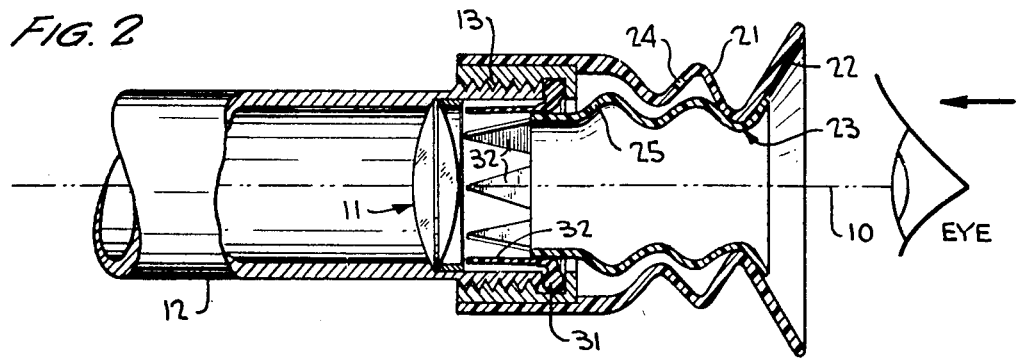
FIGURE 2 is a cross-sectional showing of a second embodiment of the device of this invention.

A second embodiment of an eyepiece for use with night vision sighting means is shown in FIGURE 2. In this embodiment a lens 11 is axially disposed within the telescope body 12 having a threaded end 13 for attachment of the eyeshield 21 in geometric alignment with the line of sight of the telescopic device, indicated at 10.

In the embodiment of FIGURE 2, the eyeshield 21 has an accordion fold, tubular configuration with an eyerest 22 of relatively conventional design which is adapted to permit the application of a compressive force (in the direction of the arrow) on the eyeshield 21.

A segmented deformable shutter 16 similar to that shown in the embodiment of FIGURE 1 is disposed intermediate the threaded end 13 and the eyerest 22 such that the several segments may be bent into axial alignment and an aperture is obtained.

In this embodiment an inner tubular member 23 which may be of relatively rigid material is connected to the eyeshield 21 in the region of the eyerest 22. This inner tubular member is adapted to act upon the segmented shutter 16 when the aforementioned compression force is applied. It will be appreciated that the degree of rigidity of the member 23 is not critical in this embodiment but that the member 23 should be sufficiently rigid to bend the segments of the shutter 16 into axial alignment. It is within the purview of this disclosure to utilize any known means for establishing the rigidity of the member 23 and the eyeshield 21. For example, the thickness and general configuration of the accordion fold sections may be other than uniform and may include auxiliary reinforcement means if desired.

It will be noted that the tubular members 16 and 21 are perforated as indicated at 24 and 25 respectively and that the perforations are not aligned. These perforations enable the circulation of air currents within the internal area of the tubular members 16 and 21 and thus minimize the possibility of condensation formation on the surface of the lens 11. By staggered dispositions of the perforations and the use of nonreflective material for the tubular members 16 and 21, the possibility of light leakage is virtually eliminated.

Figure 3:
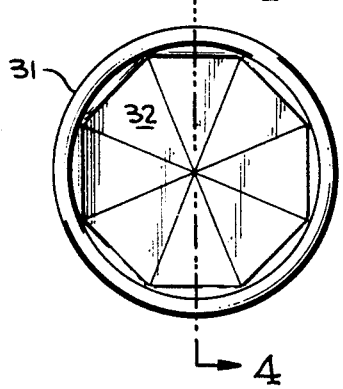
FIGURE 3 is a plan view of the segmented shutter shown in the embodiments of FIGURES 1 and 2.
Figure 4:
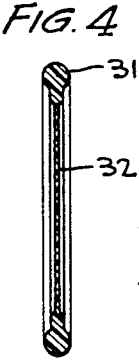
FIGURE 4 is a more detailed cross-sectional view of the segmented shutter shown in the embodiments of FIGURES 1 and 2.

FIGURES 3 and 4 are frontal and cross-sectional views respectively of the segmented diaphragm 16 shown in the several embodiments disclosed herein. It will be noted that the diaphragm may constitute a relatively rigid ring, indicated at 31, and a plurality of triangular segments 32 each hinged on the side adjacent the ring 31. While an eight segment shutter, shown in FIGURES 3 and 4 has been found to be satisfactory, it may be desirable in selected applications to incorporate a greater or lesser number of segments. Likewise, it is not essential that the segments lie in the same plane, as shown in FIGURE 4, nor that each segment be exactly coadjacent in closed position as shown in the drawing provided, of course, a complete aperture closure is obtained when in the closed position.

Figure 5:
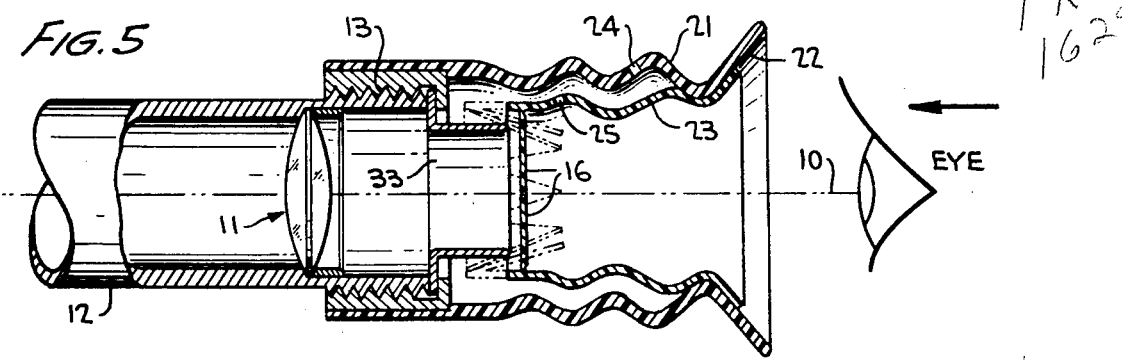
FIGURE 5 is a cross-sectional showing of a third embodiment of the device of this invention.

A third embodiment of an eyepiece for use with night vision sighting means is shown in FIGURE 5. In this embodiment, as in the embodiment of FIGURES 1 and 2, the lens 11 is axially disposed within the telescope body 12 having a threaded end 13 for attachment of the eyeshield 21. As in the embodiment of FIGURE 2, the eyeshield 21 has an accordion fold tubular configuration with an eyerest 22 of relatively conventional design which is adapted to permit the application of a compressive force (in the direction of the arrow) on the eyeshield 21.

In the embodiment shown in FIGURE 5, however, the segmented deformable shutter 16 is attached to the inner tubular member 23 to move therewith. In this embodiment, a rigid tubular member 33 is affixed to the telescope body 12 by any suitable means at any convenient point provided that view through the lens 11 is not obscured. Likewise, the inner tubular member 23 in the several depicted embodiments may be connected to the eyeshield 21 by threaded means or the equivalent to enable convenient assembly and disassembly, if desired.

It will be appreciated that the several embodiments of the invention exemplarily disclosed herein are merely illustrative of selected features of the invention and that the invention is only to be limited by the scope of the claims appended hereto.

For example, it is within the purview of this disclosure to incorporate perforations of any desired configuration or number in the eyeshield 21 and the inner tubular member 21. Likewise, it is not crucial that the device be actuated by the observer pressing directly on the eyerest and suitable cheekbone, nose or forehead rests, not shown, may be utilized to compress the accordion fold tubular members, if desired.

Finally, it is recognized that the device of this invention is readily adaptable to many diverse eyepiece applications and that the invention is not to be restricted to rifle telescope devices of the variety exemplarily disclosed herein.

What is claimed is:

1. A light shielding means for an optical telescope assembly including an eyepiece and an eyepiece lens determining an optical axis and providing an image of the object being viewed at the viewing end thereof, comprising opaque resilient means having a substantially tubular configuration and adapted for compression along the axis of said configuration, said resilient means having one end thereof adapted for attachment to said assembly such that said resilient means encompasses said eyepiece and the axis of said tubular configuration is coaxially aligned with said optical axis; opaque shutter means juxtaposed with respect to said eyepiece lens within said resilient tubular means and adapted to conceal and to expose said lens in first and second operational states, respectively, said shutter means being segmented about a center point with each segment thereof having a flexible peripheral region; shutter opener means disposed within said resilient tubular means and adapted to contact said segments of said shutter means to open said segments upon compression of said resilient tubular means.

2. A light shielding means as defined in claim 1 wherein said resilient means has an accordion fold tubular configuration and is adapted for compression of the folds thereof.

3. A light shielding means as defined in claim 2 wherein said resilient tubular means includes eyerest means at the open end thereof and said shutter opener means is a substantially rigid tubular means attached to said eyerest means and concentrically disposed with respect to said resilient tubular means.

4. A light shielding means as defined in claim 3 wherein said shutter means is disposed in fixed relation with respect to said eyepiece lens.

5. A light shielding means as defined in claim 2 wherein said resilient tubular means includes eyerest means at the open end thereof with a substantially rigid elongated support means axially disposed within said resilient tubular means and adapted to support said opaque shutter means and to move said shutter means toward said eyepiece lens as said resilient tubular means is compressed, and said shutter opener means is disposed intermediate said eyepiece lens and said shutter means in fixed relation with respect to said eyepiece lens.

6. A light shielding means as defined in claim 5 wherein said elongated support means has a tubular configuration.

References Cited

FOREIGN PATENTS 662,483  5/1963  Canada.

DAVID H. RUBIN, *Primary Examiner.*

T. H. KUSMER, *Assistant Examiner.*